United States Patent Office 2,754,306
Patented July 10, 1956

2,754,306

LACQUER PLASTICIZER

Louis I. Hansen, Minneapolis, Minn., assignor to Archer-Daniels-Midland Company, Minneapolis, Minn., a corporation of Delaware No Drawing. Application July 9, 1953,
Serial No. 367,084

22 Claims. (Cl. 260—404.8)

This invention relates to plasticizers for nitrocellulose and like compositions and more particularly to a plasticizer prepared by cold blowing higher dialkyl esters of maleinized drying oils. The invention relates especially to cold blown dioctyl esters of maleinized drying oils for use as a plasticizer for nitrocellulose based coating compositions and the like.

As employed throughout this specification and in the appended claims, the expression "maleinized" is used in the broad sense as it is used in the trade, that is, the expression "maleinized oils" is applied generally to unsaturated oils which have been treated with an alpha-beta ethylenic dicarboxylic acid compound so as to form an adduct of the unsaturated drying oil and the alpha-beta ethylenic dicarboxylic acid. Thus, for convenience hereinafter, the term "maleinized" is applied not only to oils which have been treated with maleic acid or maleic anhydride but, in accordance with trade practice, also to oils which have been treated with other alpha-beta ethylenic dicarboxylic acids, such as fumaric acid, itaconic acid and the like.

It has been known to form dialkyl esters of maleic adducts of drying oils. It has also been known to blow oils, and oil products at relatively low temperatures. Blown oils, as a general rule, however, do not have good color retention. It was not known before this invention that an improved plasticizer for nitrocellulose composition having good color retention could be produced by forming a dialkyl ester of a maleinized drying oil and then blowing at a relatively low temperature.

The principal object of this invention is to provide an improved compatible plasticizer, particularly for nitrocellulose compositions, having good color retention and excellent resistance to ultraviolet rays.

Another object of this invention is to provide an improved plasticizer comprising a blown dialkyl ester of a maleinized drying oil and to provide a method of making the same.

A further object of this invention is to provide an improved plasticizer for nitrocellulose compositions comprising a blown dioctyl ester of a maleinized soybean oil and to provide a method of making the same, including a low temperature blowing step.

Other objects of this invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Broadly stated, the invention comprises the steps of reacting a drying oil, a higher aliphatic alcohol and an alpha-beta ethylenic dicarboxylic acid or anhydride at an elevated temperature to form a dialkyl ester of a maleinized drying oil and blowing this ester with air or other oxidizing gas at an elevated but relatively low temperature until the ester becomes light in color and then preferably continuing to blow the ester at an elevated, but somewhat lower temperature, until the blown ester begins to gel and cutting back with an alcohol to form a homogeneous lacquer plasticizer having the desired viscosity.

Although the invention will be described in detail with reference to soybean oil, maleic anhydride and iso-octyl alcohol, it is to be understood that the invention itself is not intended to be so limited; but that other oils, other alpha-beta ethylenic dicarboxylic acid compounds and other aliphatic alcohols may be used to carry out the reaction.

More specifically then, the invention comprises charging a reaction vessel with a soybean oil, at least about 4 per cent of maleic anhydride based upon the total weight of the soybean oil and maleic anhydride and iso-octyl alcohol in an amount from 5 to 15 per cent in excess of the stoichiometric amount and preferably a small amount of an inert organic solvent such as xylene to form an azeotropic mixture for removal of the water formed in the reaction. The vessel should be equipped with a distillation column for the azeotrophic distillation, a thermometer, mechanical stirring means, suitable heating means, and should be strong enough to withstand distillation at reduced pressures. The temperature of the reaction mixture is then raised as rapidly as possible to between about 400° and 500° F. at which temperature the xylene begins to reflux. The elevated temperature is maintained for from about one and one-half to six hours until most of the water of esterification is removed. The reaction is held at the elevated temperature for an additional 3 to 8 hours until the acid number is reduced to about 2 to 3.0 at which time the temperature is reduced somewhat and the xylene and excess iso-octyl alcohol are removed under reduced pressure until the volatility is essentially zero.

The reaction mass is then cooled out of contact with air to about 200° F. The cooled ester may be filtered if desired and is charged to a blowing kettle equipped with means for discharging air or other oxidizing gas uniformly in fine streams through the mass. The blowing gas is charged at a rate of from about one to four cubic feet per pound of ester per hour while the ester is maintained at a temperature of between about 150° to 220° F. The blowing is continued until the so-called "light point" is reached. The "light point" has been attained when any of the following three indicative characteristics appear: (1) color on a Gardner scale of 3 to 4; (2) specific gravity of about 0.9544; or (3) a viscosity at Gardner-Holdt seconds of approximately 4.3.

As blowing proceeds at the relatively higher temperatures during the first stage, the initial relatively light color of the ester deepens and the ester takes on a reddish hue. During this stage of blowing no oxidation occurs. As blowing continues, the ester again lightens in color until the so called "light point" occurs. Then, as blowing continues, the ester begins to take up oxygen and the viscosity begins to increase.

Preferably, when the "light point" has been reached, the ester is cooled to between about 80° to 150° F. and blowing is then continued until the blown ester has reached the point of incipient gelatin, that is, until a viscosity in the range of W to Z (Gardner-Holdt) is obtained when 15 per cent by weight of the tested sample is a proprietary grade of ethyl alcohol. When the test sample possesses this desired viscosity, the entire batch is cut back to about this viscosity with a suitable solvent to form a homogeneous completed lacquer plasticizer.

For many purposes, a suitable plasticizer results when blowing is discontinued when the blown ester has reached the "light point." This finished blown ester product has a viscosity such that it may be used directly as a lacquer plasticizer without the necessity of cutting back with a solvent. It has been found, however, that the aging characteristics of the blown esters improve somewhat as the second stage of blowing is carried on toward the point of incipient gelation and the esters are then cut back with a solvent to the desired viscosity range. If desired, the blowing with air or other oxidizing gas may accordingly be stopped at any point intermediate of the "light point" and incipient gelation. As blowing is allowed to continue past the "light point," the viscosity of the ester increases so that greater amounts of solvent will be required to bring the ester back to the desired viscosity range. For a dialkyl ester of a maleinized drying oil blown to the point of incipient gelation usually at least about 15 per cent by weight and up to as high as 30 per cent by weight of solvent may be required to cut back the blown ester to a desired viscosity approximately in the range of W to Z in the Gardner-Holdt scale. The amount of solvent which is added to produce this finished plasticizer will range from zero at the "light point" to at least about 15 per cent at the point of incipient gelation.

Although other lower aliphatic alcohols may be used as the solvent, it is preferred to employ ethanol. An alcohol-base general purpose solvent available under the registered trademark "Solox" from U. S. Industrial Chemicals Company and consisting of 100 parts of especially denatured alcohol, 5 parts of ethyl acetate and 1 part of aviation gasoline has been used for this purpose.

The esterification temperature may be between 400° to 500° F. It is preferred, however, to raise the temperature initially to a temperature between about 420° to 440° F. and then as the water of esterification is gradually removed, allow the temperature to rise to between about 450° to 475° F. The time required to remove the water of esterification will, of course, depend largely upon the temperature stirring and rate of reflux of the reaction mass. For the preferred temperature ranges this time will be approximately three hours. The time required to reduce the acid number to about 2 to 3 during the esterification reaction is a function of the temperature rate of stirring, rate of reflux and the concentration of iso-octyl alcohol. When the preferred temperature ranges are employed and the initial concentration of iso-octyl alcohol is the stoichiometric amount plus about 10 per cent excess the elapsed time is about six hours.

It is desirable that the amount of excess isooctyl alcohol be kept to a minimum. Although the alcohol may be present in amounts from about five to fifteen per cent in excess of the stoichiometric amount, it is preferred that the excess iso-octyl alcohol be present in the range of from about seven and one-half to eleven per cent. The iso-octyl alcohol may be used to form the azeotropic mixture for removal of the water of esterification but it is preferred to use xylene for this purpose.

The temperature during the initial blowing, that is, until the "light point" is reached, may range from about 150° to 220° F. It is preferred, however, that a temperature be employed in the range between about 180° to 200° F. and most preferably at about 190° F. The temperature at which the ester is blown during the second stage, that is, from the "light point" to termination may be in the range of about 80° to 150° F. but is preferably in the range between about 95° to 110° F. and desirably at approximately 100° F.

When maleic anhydride is used as the alpha-beta ethylenic dicarboxylic acid, it should be present initially in an amount of at least four per cent by weight and preferably at least six per cent based on the weight of the oil plus the acid anhydride. Larger amounts up to about ten per cent by weight may be employed. It is to be understood, however, that alpha-beta ethylenic dicarboxylic acid compounds other than maleic acid and maleic anhydride may be used, such as, for example, fumaric acid, itaconic acid and anhydride and the like. As higher molecular weight alpha-beta ethylenic dicarboxylic acid compounds are used correspondingly greater amounts by weight of the acid compound will be required.

In addition to soybean oil, the reactions of this invention have been carried out with walnut oil, linseed oil, safflower oil and the like. It has been found, however, that for the purposes of producing plasticizers for nitrocellulose compositions that soybean oil extended the most desirable features. Other alcohols including methyl, butyl, allyl and decyl have also been used in this synthesis. In general, alcohols having from 1 to about 13 carbon atoms may be used in the process of this invention, but it has been found that the octyl alcohols, e. g., n-octanol, iso-octyl alcohol and 2-ethyl hexanol offer the most desirable characteristics for nitrocellulose plasticizers. Mixed esters may be prepared by initially employing mixed alcohols.

The esterification step of the reaction of this invention may be carried out by two methods other than the uniphase reaction described above. The first of these is the adduct method by which a dialkyl ester is first formed in a separate reaction between the alcohol and the alpha-beta ethylenic dicarboxylic acid compound and is then subsequently reacted with soybean oil. The second method is a two-step method by which the soybean oil is first maleinized by reaction with an alpha-beta ethylenic dicarboxylic acid compound and this product is subsequently esterified by reaction with the alcohol.

The invention is further illustrated in detail by means of the following specific example:

The di iso-octyl ester of maleinized soybean oil was prepared in a uniphase reaction as follows: A reaction vessel was prepared comprising a stainless steel autoclave fitted with an azeotropic head, heating means, thermometer and mechanical agitator. The reaction vessel was charged with 73.62 pounds of "SUPERB" soybean oil, 14.02 pounds of iso-octyl alcohol, 4.72 pounds of maleic anhydride and 7.54 pounds of xylene. The maleic anhydride was present in the amount of 6 per cent by weight based upon the total weight of the soybean oil and the maleic anhydride. Based upon 4.72 pounds of maleic anhydride the stoichiometric proportions of iso-octyl alcohol would be 12.48 pounds. Actually, 14.02 pounds were used, an excess of 1.54 pounds or 11 per cent. After the soybean oil, the iso-octyl alcohol, the maleic anhydride and the xylene were charged to the reaction vessel, the temperature was raised as rapidly as possible to 430° F. at the same time agitating the mixture. At 430° F. the xylene began to reflux. After a period of about three hours, most of the water of esterification had been removed and the temperature had risen to 460–465° F. The reaction mass was held at this temperature until the acid number was reduced to 2.0 to 3.0. When the desired acidity was reached after an elapsed time of six hours and twenty minutes, the system was cooled to 423° F. The xylene was then removed at a reduced pressure of 29 inches of vacuum between 423–425° F. The excess iso-octyl alcohol was also removed, with entrained steam, during this vacuum distillation, which lasted for 40 minutes. The ester was allowed to cool to 200° F. before any air was admitted to the reaction vessel and before filtering was begun. The finished unblown compound was comprised substantially of an adduct of 18.15 per cent dioctyl maleate and 81.85 per cent soybean oil and met the following specifications:

| | |
|---|---|
| Percent volatile | .03. |
| Acid number | 2–3. |
| Color | 3–4 (Gardner). |
| Viscosity | D-E (Gardner-Holdt). |
| Specific gravity | .9360. |
| Saponification No. | 198–204. |

The completed di iso-octyl ester of maleinized soybean oil was charged to a blowing kettle. Air was discharged through the mass of ester at a rate of approximately 2 cubic feet of air per hour for each pound of ester and the temperature was raised to 190° F. and held until the ester reached the so-called "light point" described above. At the "light point" the ester was cooled to 100° F. and blowing was continued at this temperature until a viscosity in the range of W to Z (Gardner-Holdt) was obtained when 15% by weight of the tested sample was a proprietary grade ethyl alcohol (Solox). When the test sample reached the desired viscosity, the entire batch was cut to 85 per cent non-volatiles with a proprietary grade of ethyl alcohol to form the completed homogeneous lacquer plasticizer. The completed blown ester met the following specification, all based on 85 per cent non-volatile basis:

| | |
|---|---|
| Acid number | 12.75 maximum. |
| Alcohol tolerance | 70 parts alcohol minimum per 100 parts oil solids. |
| Specific gravity | .9650 minimum, .9770 maximum. |
| Viscosity | 10.70 stokes minimum, 22.70 stokes maximum or W (Gardner-Holdt) minimum, Z (Gardner-Holdt) maximum. |
| Color (1933 Gardner standards). | 3 minimum, 6 maximum. |

The completed blown di alkyl ester of the maleinized soybean oil of this invention is primarily a plasticizer for nitrocellulose based coatings and includes recommended usage in the following types of protective coatings and miscellaneous applications: lacquer type sealers, primers, and surfaces for wood, wood compositions, ceramics, and metals; lacquer type gloss and semi-gloss finish coats for wood and wood composition products; lacquer enamels for wood, wood compositions and metal surfaces; lacquer type leather coatings; lacquer type cloth coatings; linoleum and floor brushing lacquers; lacquer type cable or insulation coatings; adhesives; mastics; secondary plasticization of synthetic baking finishes; automotive finish coat lacquers; and shellac substitutes and the like.

Contrary to blown oils in general, the blown di octyl ester of maleinized soybean oil of this invention has good color retention. Its primary advantage is the excellent resistance to ultraviolet that it imparts, particularly as its use concerns blonde wood finishes. Here the original bleached or blonded color condition must remain throughout the service life of the furniture and the finish is required to maintain good color retention. This good color retention is also a very important factor in the stability of lacquer enamels of white and light tint pigmentation when exposed to ultraviolet light. This plasticizer exerts a stabilizing effect upon the discoloration of the nitrocellulose itself and upgrades certain plasticizers having mediocre or poor color retention characteristics. Blown di octyl ester of maleinized soybean oil maintains a high degree of luster and clarity in rubbed furniture finishes that is appealing. With basically compatible modifying ingredients, haziness, milkiness, slight opacity and the like are absent. It has a wide range of compatibility which makes it highly acceptable. Compatibility with non-drying lacquer resins and gums, semi-drying and drying resins, nitrocelluloses, and solvents is for the most part very favorable to a broad range of applications.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. A method of making a plasticizer for nitrocellulose and like compositions comprising a blown dialkyl ester of a maleinized drying oil which method comprises the steps of forming a dialkyl ester of a maleinized drying oil by reacting a drying oil, an aliphatic alcohol having from 1 to 13 carbon atoms and a compound selected from the group consisting of alpha-beta ethylenic dicarboxylic acids and anhydrides, said ester having an acid value not greater than about 3, and blowing the ester with an oxidizing gas at a temperature of from about 150° to 220° F. until the blown ester becomes light in color.

2. As a new composition of matter, a blown dialkyl ester of a maleinized drying oil produced by the method of claim 1.

3. A method of making a plasticizer for nitrocellulose and like compositions comprising a blown dialkyl ester of a maleinized drying oil, which method comprises the steps of forming a dialkyl ester of a maleinized drying oil by reacting a drying oil, an aliphatic alcohol having from 1 to 13 carbon atoms and a compound selected from the group consisting of alpha-beta ethylenic dicarboxylic acids and anhydrides said ester having an acid value not greater than about 3, blowing the ester with an oxidizing gas initially at a temperature of from about 150° to 220° F. until the blown ester becomes light in color and then continuing blowing at a temperature of from about 80° to 150° F. to the point of incipient gelation and then cutting back with an organic solvent until the desired viscosity is obtained.

4. As a new composition of matter, a blown dialkyl ester of a maleinized drying oil produced by the method of claim 3.

5. A method of making a plasticizer for nitrocellulose and like compositions, comprising a blown dialkyl ester of a maleinized soybean oil which method comprises the steps of first forming a dialkyl ester of a maleinized soybean oil by reacting a soybean oil, an aliphatic alcohol having from 1 to 13 carbon atoms and a compound selected from the group consisting of alpha-beta ethylenic dicarboxylic acids and anhydrides, said ester having an acid value not greater than about 3, and then blowing the ester with an oxidizing gas at a temperature of from about 150° to 220° F. until the blown ester becomes light in color.

6. As a new composition of matter, a blown dialkyl ester of a maleinized soybean oil produced by the method of claim 5.

7. A method of making a plasticizer for nitrocellulose and like compositions comprising a blown dialkyl ester of a maleinized soybean oil which method comprises the steps of first forming a dialkyl ester of a maleinized soybean oil by reacting a soybean oil, an aliphatic alcohol having from 1 to 13 carbon atoms and a compound selected from the group consisting of alpha-beta ethylenic dicarboxylic acids and anhydrides, said ester having an acid value not greater than about 3, and then blowing the ester with an oxidizing gas initially at a temperature of from about 150° to 220° F. until the blown ester becomes light in color, and then continuing blowing at a temperature of from about 80° to 150° F. to the point of incipient gelation and then cutting back with an organic solvent until the desired viscosity is obtained.

8. As a new composition of matter, a blown dialkyl ester of a maleinized soybean oil produced by the method of claim 7.

9. A method of making a plasticizer for nitrocellulose and like compositions comprising a blown dioctyl ester of a maleinized soybean oil which method comprises the steps of first forming the dioctyl ester by reacting a soybean oil, octyl alcohol and a compound selected from the group consisting of alpha-beta ethylenic dicarboxylic acids and anhydrides, said ester having an acid value not greater than about 3, and then blowing the ester with an oxidizing gas at a temperature of from about 150° to 220° F. until the blown ester becomes light in color.

10. As a new composition of matter a blown dioctyl ester of maleinized soybean oil produced by the method of claim 9.

11. A method of making a plasticizer for nitrocellulose and like compositions comprising a blown dioctyl ester of a maleinized soybean oil which method comprises the steps of first forming the dioctyl ester by reacting a soybean oil, octyl alcohol and a compound selected from the group consisting of alpha-beta ethylenic dicarboxylic acids and anhydrides, said ester having an acid value not greater than about 3, and then blowing the ester with an oxidizing gas initially at a temperature of from about 150° to 220° F. until the blown ester becomes light in color and then continuing blowing at a temperature of from about 80° to 150° F. to the point of incipient gelation and then cutting back with an organic solvent until the desired viscosity is obtained.

12. As a new composition of matter a blown dioctyl ester of maleinized soybean oil produced by the method of claim 11.

13. A method of making a plasticizer for nitrocellulose and like compositions comprising a blown dioctyl ester of a maleinized soybean oil which method comprises the steps of first forming the dioctyl ester of the maleinized soybean oil by reacting an octyl alcohol with a compound selected from the group consisting of alpha-beta ethylenic dicarboxylic acids and anhydrides to form a dioctyl ester, and reacting the dioctyl ester with soybean oil the resulting soybean ester having an acid value not greater than about 3, and then blowing the completed soybean oil ester with an oxidizing gas initially at a temperature of from about 150° to 220° F. until the blown ester has become light in color and then continuing blowing at a temperature of from about 80° to 150° F. to the point of incipient gelation and then cutting back with an organic solvent until the desired viscosity is obtained.

14. A method of making a plasticizer for nitro-cellulose and like compositions comprising a blown dioctyl ester of a maleinized soybean oil which method comprises the steps of first forming the dioctyl ester of the maleinized soybean oil by reacting a soybean oil with a compound selected from the group consisting of alpha-beta ethylenic dicarboxylic acids and anhydrides and reacting this maleinized oil with an octyl alcohol to form the ester, holding the ester at the reaction temperature until the acid value is reduced to not greater than about 3, and then blowing the completed ester with an oxidizing gas initially at a temperature between about 150° and 220° F. until the blown ester has become light in color and then continuing blowing at a temperature between about 80° and 150° F. to the point of incipient gelation and then cutting back with an organic solvent until the desired viscosity is obtained.

15. A method of making a plasticizer for nitro-cellulose and like compositions comprising a blown dioctyl ester of a maleinized soybean oil which method comprises the steps of first forming the dioctyl ester in a uniphase reaction by reacting a soybean oil, octyl alcohol and a compound selected from the group consisting of alpha-beta ethylenic dicarboxylic acids and anhydrides at a temperature between about 400° and 500° F., holding at said elevated reaction temperature until the acid value is reduced to not greater than about 3, cooling, and then blowing with an oxidizing gas at an initial temperature of from about 150° to 220° F. until the light point is reached and then continuing blowing at a reduced temperature between about 80° and 150° F. and cutting back with an organic solvent until the desired viscosity is obtained.

16. A method of making a plasticizer for nitro-cellulose and like compositions comprising a blown dioctyl ester of a maleinized soybean oil which method comprises the steps of first forming the dioctyl ester in a uniphase reaction by reacting a soybean oil, octyl alcohol and a compound selected from the group consisting of maleic acid and maleic anhydride in the presence of an insert organic azeotroping solvent at a temperature between about 400° and 500° F., removing the water of esterification, holding the ester at said elevated reaction temperature until the acid value is reduced to not greater than about 3, removing azeotropic solvent and cooling and then blowing the completed ester with an oxidizing gas at an initial temperature of from about 150° to 220° F. until the light point is reached and then continuing blowing at a reduced temperature between about 80° and 150° F. and cutting back with an organic solvent until the desired viscosity is reached.

17. A method of making a plasticizer for nitro-cellulose and like compositions comprising a blown dioctyl ester of a maleinized soybean oil, which method comprises the steps of first forming the dioctyl ester in a uniphase reaction by reacting a soybean oil, a compound selected from the group consisting of maleic acid and maleic anhydride in an amount from about 4 to 10 per cent by weight based upon the total weight of the oil and maleic compound and octyl alcohol in an amount from about 5 to 15 per cent in excess of the stoichiometric amount in the presence of an inert organic azeotroping solvent at a temperature between about 400° and 500° F., removing the water of esterification, holding the ester at said elevated reaction temperature until the acid value is reduced to not greater than about 3, removing the azeotroping solvent and the excess alcohol and cooling and then blowing the completed ester with an oxidizing gas at an initial temperature between about 180° and 200° F. until the light point is reached and then continuing blowing at a reduced temperature between about 95° and 110° F. and cutting back with an organic solvent until the desired viscosity is reached.

18. A method of making a plasticizer for nitro-cellulose and like compositions comprising a blown dioctyl ester of a maleinized soybean oil, which method comprises the steps of first forming the dioctyl ester in a uniphase reaction by reacting a soybean oil, a compound selected from the group consisting of maleic acid and maleic anhydride in an amount from about 6 to 8 per cent by weight based upon the total weight of the oil and the maleic compound and octyl alcohol in an amount from about 7½ to 11 per cent in excess of the stoichiometric amount in the presence of an inert organic azeotroping solvent by first heating to a temperature between about 420° and 440° F., increasing the temperature to between about 450° and 475° F. as the water of esterification is removed and holding this temperature until the acid number is between about 2 and 3, removing the azeotroping solvent and the excess alcohol and cooling and then blowing the completed ester with an oxidizing gas at a rate between about 1 to 4 cubic feet of gas per hour per pound of ester at an initial temperature between about 180° and 220° F. until the light point is reached and thereafter continuing blowing at a reduced temperature between about 95° and 110° F. to the point of incipient gelation and then cutting back with an organic solvent until the desired viscosity is reached.

19. The method of claim 18 further characterized in that the maleic compound is maleic anhydride.

20. The method of claim 18 further characterized in that the octyl alcohol is iso-octyl alcohol.

21. The method of making a plasticizer for nitro-cellulose and like compositions comprising a blown di iso-octyl ester of maleinized soybean oil, which method comprises the steps of first forming the di iso-octyl ester in a uniphase reaction by reacting a soybean oil, maleic anhydride in an amount from about 6 to 8 per cent by weight based upon the total weight of the oil and the maleic compound and iso-octyl alcohol in an amount from about 7½ to 11 per cent in excess of the stoichiometric amount in the presence of a small amount of xylene as an inert organic azeotroping solvent by first heating to about 430° F., increasing the temperature to between about 460° and 465° F. as the water of esterification is being removed, holding the temperature between about 460° and 465° F. until the acid number is between about 2 and 3, removing the azeotroping solvent and excess alcohol under reduced pressure, and cooling, and then blowing the completed ester with air at a rate of about two cubic feet of air per hour per pound of ester and at an initial temperature of about 190 F. until the light point is reached and thereafter continuing blowing at a reduced temperature of about 100° F. until a viscosity between W and Z on the Gardner-Holdt scale is reached when the product is cut to 85 per cent non-volatile with ethyl alcohol.

22. As a new composition of matter, a plasticizer comprising a blown di iso-octyl ester of maleinized soybean oil produced according to the method of claim 21.

References Cited in the file of this patent

UNITED STATES PATENTS

| | | |
|---|---|---|
| 2,178,604 | Novak | Nov. 7, 1939 |
| 2,188,884 | Clocker | Jan. 30, 1940 |
| 2,188,885 | Clocker | Jan. 30, 1940 |
| 2,444,328 | Blair | June 29, 1948 |